US006553305B2

(12) United States Patent
Dixon et al.

(10) Patent No.: US 6,553,305 B2
(45) Date of Patent: Apr. 22, 2003

(54) REAL TIME ADAPTIVE ENGINE POSITION ESTIMATION

(75) Inventors: Jon Dixon, Essex (GB); Michael Joseph Fitzpatrick, Essex (GB)

(73) Assignee: Visteon Global Technologies, Inc., Dearborn, MI (US)

( * ) Notice: Subject to any disclaimer, the term of this patent is extended or adjusted under 35 U.S.C. 154(b) by 118 days.

(21) Appl. No.: 09/752,187

(22) Filed: Dec. 29, 2000

(65) Prior Publication Data

US 2002/0087256 A1 Jul. 4, 2002

(51) Int. Cl.[7] ............................ G01L 23/30; F02P 5/08

(52) U.S. Cl. ....................... 701/102; 701/115; 701/114; 73/117.3

(58) Field of Search ................................ 701/102, 104, 701/106, 114, 115; 123/406.42, 406.23, 406.27, 406.43, 435, 436; 73/117.3

(56) References Cited

U.S. PATENT DOCUMENTS

| | | | | | |
|---|---|---|---|---|---|
| 4,471,739 | A | * | 9/1984 | Yamato et al. | 123/479 |
| 4,505,152 | A | * | 3/1985 | Haddox | 73/115 |
| 4,744,243 | A | * | 5/1988 | Tanaka | 73/117.3 |
| 4,892,075 | A | * | 1/1990 | Iriyama et al. | 123/406.27 |
| 5,000,042 | A | * | 3/1991 | Luebbering | 73/119 A |
| 5,386,723 | A | * | 2/1995 | Wier | 73/117.3 |
| 5,623,412 | A | * | 4/1997 | Masson et al. | 701/102 |
| 6,272,426 | B1 | * | 8/2001 | Tascillo | 701/115 |
| 2002/0066445 | A1 | * | 6/2002 | Thomas | 123/435 |

FOREIGN PATENT DOCUMENTS

| | | | | |
|---|---|---|---|---|
| DE | 24 30 323 A1 | * | 1/1976 | F02P/5/08 |
| GB | WO 93/14387 | * | 7/1993 | G01L/23/30 |
| SU | 1463141 A | * | 2/1989 | G01L/23/30 |

* cited by examiner

*Primary Examiner*—Hieu T. Vo
(74) *Attorney, Agent, or Firm*—John Kajander, Esq.

(57) ABSTRACT

An adapting engine system 10 including at least one pressure sensor 12 positioned within a cylinder of an internal combustion engine, an engine control processor 14 receiving data from the pressure sensor 12 and using the data to determine engine position periodically throughout the life of the engine, and memory 16.

13 Claims, 1 Drawing Sheet

REAL TIME ADAPTIVE ENGINE POSITION ESTIMATION

TECHNICAL FIELD

The present invention relates generally to a real time adaptive engine system and more particularly to a real time adaptive engine system with improved estimation of piston position.

BACKGROUND Of THE INVENTION

Modern automotive engine systems often require an accurate determination of engine position. Engine position is utilized to sequence a variety of engine functions including injection and ignition timing. The increasing emphasis on efficiency and environmental concerns will continue to make an accurate determination of engine position an important element of engine system design.

Often, engine control systems use crankshaft position sensors (CPS) to determine engine position. The use of CPS information alone, however, can have several disadvantages. Errors in the CPS information can arise from a variety of circumstances. It is known that these errors can arise from tolerances in the cast sensor holes, bolt-up errors in the flywheel position, and position errors in the installation of the sensors. Modern engine designs often attempt to minimize such errors through precise manufacturing and assembly. It is known, however, that such precise manufacturing and assembly can lead to undesirable cost increases. Often, even with precise manufacturing and assembly, errors can still persist. In addition, maintenance operations performed on the CPS throughout the life of the engine system can compromise initial precision in manufacturing and assembly. Typical tolerances for CPS accuracy are plus or minus one percent, but as higher requirements for engine performance and efficiency increase, a higher accuracy will be desirable.

It would, therefore, be highly desirable to have a system for determining engine position with improved accuracy and reduced manufacturing and assembly costs.

SUMMARY OF THE INVENTION

It is therefore an object of the present invention to provide an adaptive engine system with improved engine position determination. It is a further object of the present invention to provide an adaptive engine system with reduced manufacturing and assembly costs.

In accordance with the above and other objects of the present invention, an adaptive engine system is provided. The adaptive engine system includes at least one pressure sensor. The at least one pressure sensor is positioned within a cylinder of an internal combustion engine. The adaptive engine system further includes an engine control processor and memory. The engine control processor utilizes data provided by the at least one pressure sensor to determine engine position periodically throughout the lifetime of the engine.

Other objects and features of the present invention will become apparent when viewed in light of the detailed description of the preferred embodiment when taken in conjunction with the attached drawings and appended claims.

DESCRIPTION OF THE PREFERRED EMBODIMENTS(S)

Figure 1:
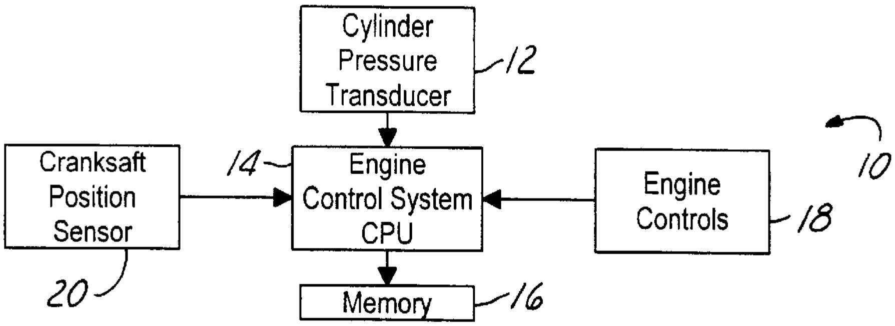
FIG. 1 is a flow chart schematically illustrating an embodiment of an adaptive engine system in accordance with the present invention.

FIG. 1 is an illustration of an embodiment of an adaptive engine system 10 in accordance with the present invention. The adaptive engine system 10 is preferably for use in automotive engine applications. It is contemplated, however, that the adaptive engine system 10 can be used in a variety of engine systems including non-automotive applications.

The adaptive engine system 10 includes a cylinder pressure transducer 12. Cylinder pressure transducers 12 are well known in the art and are typically used to monitor the pressure within an engine cylinder during operation of the engine. The present invention utilizes at least one cylinder pressure transducer 12 although multiple transducers may be used. In one embodiment, a separate cylinder pressure transducer 12 is positioned within each cylinder of an internal combustion engine. Although cylinder pressure transducers 12 have been used in the prior art, their usage has been primarily limited to test and evaluation systems. They have not been used in a real time adaptive engine system as disclosed in the present invention.

The information measured and/or received by the cylinder pressure transducers 12 is transferred to and processed by an engine control system CPU 14. Commonly, such an engine control system CPU 14 works in conjunction with a memory element 16 for storing and retrieving such information. The engine control system CPU 14 utilizes the information provided by the cylinder pressure transducers 12 to determine engine position. Once engine position has been determined, the engine control system CPU 14 can adjust the engine controls 18 such that engine performance is improved. Such engine controls 18 include, but are not limited to, ignition timing and fuel injection timing.

Although it is possible for the engine control system CPU 14 to use information from the cylinder pressure transducers 14 alone to determine engine position, in one preferred embodiment, the engine control system CPU 14 utilizes information from a crankshaft position sensor 20 in conjunction with the information received from the cylinder pressure transducers 14 to determine engine position. This is accomplished by using the information from the cylinder pressure transducers 14 to calculate an offset value (difference between pressure sensor indicated TDC and TDC indicated by the crankshaft position sensor) to be used as a correction factor for the data received by the crankshaft position sensor 20. This is preferable since information from the cylinder pressure transducers 14 need only be read during periods of engine operation when such information will be the most consistent and reliable. These periods will be further discussed below.

Figure 2:
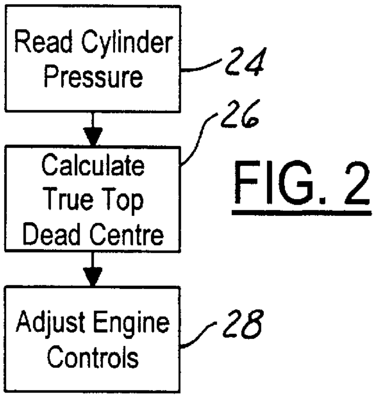
FIG. 2 is a flow chart schematically illustrating an embodiment of an adaptive engine system in accordance with the present invention.

Referring now to FIG. 2, which is a flow chart illustration of one possible operation of the adaptive engine system 10 in accordance with the present invention. In its most simplistic operation the adaptive engine system 10 reads the cylinder pressure 24, uses this information to calculate the true top dead center 26 of the engine, and adjust the engine controls 28 to accommodate for the true top dead center. Although a variety of methods can be used to determine true top dead center of the engine (engine position), one preferred method uses the cylinder pressure to determine an offset (correction factor) for data provided by a crankshaft position sensor (CPS). A more detailed description of the operation of the adaptive engine system 10 follows.

Figure 3:
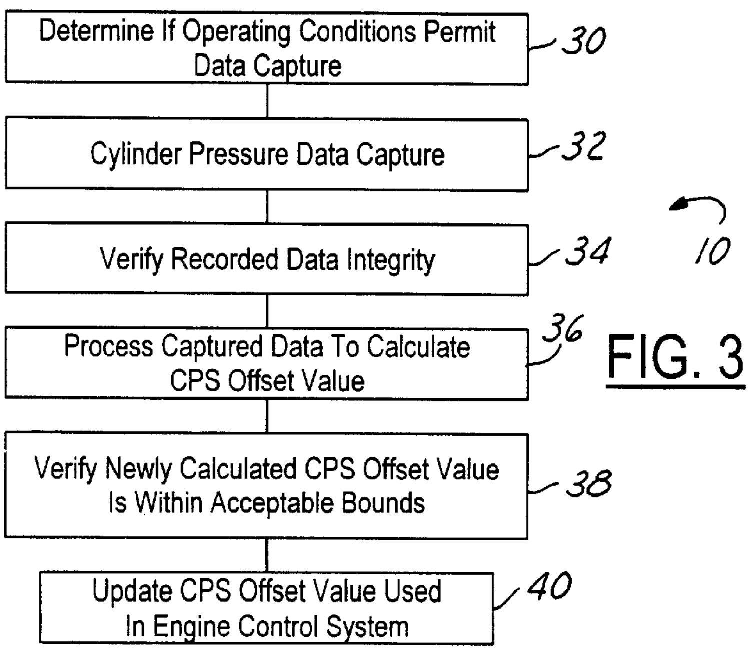
FIG. 3 is a flow chart schematically illustrating an embodiment of an adaptive engine system in accordance with the present invention.

Referring now to FIG. 3, which is a flow chart illustration of one possible operation of the adaptive engine system 10 in accordance with the present invention. The adaptive engine system 10 can initially determine if operating conditions permit data capture 30. It is contemplated that this process can be eliminated as long as one of many methods known in the art for eliminating improper data readings are employed. In one embodiment, the data is only captured during non-combustion events. This is one of the many known methods in the prior art for reducing improper data readings. Non-combustion events are well known in the prior art. Typically, these events occur during deceleration when no input to the throttle is present. In alternate embodiments, the non-combustion events can be further limited to periods when no fault codes are set, air charge temperatures are within certain limits, coolant temperature is within limits, or deceleration is persistent. These events are listed only by way of example, and their use, as well as the use of other factors for determining non-combustion situations are well known in the prior art.

If an initial check of operating conditions is utilized, when such conditions are permissible, cylinder pressure data is captured 32. It should be understood, however, that in other embodiments the data may be captured continuously and valuable data may be separated from inaccurate data or less valuable in a later process. The capture of cylinder pressure data 32 is well known in the prior art. In one embodiment, several data captures may be performed and averaged before the data is processed. In other embodiments, however, single data values may be processed as they are read.

An additional process of verifying recorded data integrity 34 may be further employed prior to data processing. Although a variety of known methods for verifying data integrity are known, in one embodiment the verifying recorded data integrity 34 is accomplished by eliminating data values that vary in value too far from the average readings. Although this process is highly valuable, it is not essential to the adaptive engine system 10.

The adaptive engine system 10 then processes the captured data to calculate a CPS offset value 36. Although a variety of methods are known for calculating a CPS offset value using captured cylinder pressure data, one embodiment in accordance with the present invention utilizes a calculation to determine an apparent polytropic index in order to determine the CPS offset value. This embodiment utilizes two consecutive pressure readings and corresponding cylinder volumes to determine the apparent polytropic index from the equation:

$$n=\log(P_1/P_2)/\log(V_2/V_1)$$

Once the engine position is close to top dead center (TDC) the changes in volume with respect to crank angle are small, and any error in the calculation of the volume becomes large relative to the resultant cylinder pressure. By finding the apparent polytropic index which minimizes the deviation away from the errors around the nominal value, a new value for the CPS offset is found. These calculations, as well as other methods, are well known in the prior art.

In one embodiment, the adaptive engine system 10 may optionally include a process that verifies the newly calculated CPS offset value is within acceptable bounds 38. Although this process need not be utilized, it provides additional protection against incorrect CPS offset values from being incorporated into the adaptive engine system 10. Methods for determining what such bounds are acceptable, are well known in the prior art. The newly calculated CPS offset value is then used to update the CPS offset value used in the engine control system 40.

In one embodiment, the CPS offset calculated and used may be an averaged value across all of the cylinders of the engine. In alternate embodiments, however, separate values may be calculated and stored for each cylinder independently. One advantage of calculating and storing separate values is that the accuracy of the offset is known to increase. The accuracy is improved since errors in the relative positioning of slots in a CPS trigger wheel or other cylinder to cylinder differences are accounted for in the separately stored embodiment. Calculating separate offsets further decreases the need for tight manufacturing tolerances.

In an alternate embodiment (not shown) for engine systems which use a variable camshaft timing mechanism, where the accuracy of the camshaft positional control is dependent on the relative angle of the camshaft to crankshaft angle timing signals, the present invention may be used to provide more accurate engine crankshaft positions in order to improve the accuracy of positioning the camshaft. This may result in improved system performance.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. An adaptive engine system comprising:

at least one pressure sensor positioned within a cylinder of an internal combustion engine;

an engine control processor for receiving data from said at least one pressure sensor, said data is captured by said engine control processor only during non-combustion events; and a memory device;

wherein said engine control processor utilizes said data to determine engine position periodically throughout the life of said engine.

2. An adaptive engine system as described in claim 1 further comprising:

a crankshaft position sensor;

wherein said engine control processor verifies the integrity of said data prior to determination of engine position.

3. An adaptive engine system as described in claim 1 wherein at least one pressure sensor comprises a pressure sensor positioned in each cylinder of said internal combustion engine.

4. An adaptive engine system as described in claim 1 wherein said engine position is utilized to control ignition timing.

5. An adaptive engine system as described in claim 1 wherein said engine position is utilized to control fuel injection timing.

6. An adaptive engine system comprising at least one pressure sensor which is positioned within a cylinder of a combustion engine;

a crankshaft position sensor;

an engine control processor, said engine control processor capable of receiving data from said at least one pressure sensor and information from said crankshaft position sensor; and a memory device;

wherein said engine control sensor utilizes said data from two consecutive readings to determine an apparent polytropic index, said apparent polytropic index utilized to correct said information from said crankshaft position sensor periodically throughout the life of said engine.

7. An adaptive engine system as described in claim 6 wherein said at least one pressure sensor comprises a pressure sensor positioned in each cylinder of said internal combustion engine.

8. An adaptive engine system as described in claim 6 wherein said engine position is utilized to determine ignition timing.

9. An adaptive engine system as described in claim 6 wherein said engine position is utilized to control fuel injection timing.

10. An adaptive engine system as described in claim 6 wherein said data is captured by said engine control processor during non-combustion events.

11. A method of adapting and engine system periodically throughout the life of the engine comprising:

determining if operating conditions permit data capture, wherein said operating conditions permit data capture only during non-combustion events;

capturing cylinder pressure data;

processing said cylinder pressure data to calculate a CPS offset value by calculating an apparent polytropic index; and updating the CPS offset value within an engine control system.

12. A method of adapting an engine system periodically throughout the life of the engine as described in claim 11, further comprising:

verifying the captured data integrity, said verifying captured data integrity taking place prior to said processing said cylinder pressure data to calculate a CPS offset value.

13. A method of adapting an engine system periodically throughout the life of the engine as described in claim 11, further comprising:

verifying the calculated CPS offset value is within acceptable bounds.

* * * * *